United States Patent
Evans et al.

(10) Patent No.: US 7,317,981 B2
(45) Date of Patent: Jan. 8, 2008

(54) AIRCRAFT BRAKE ACTUATION SYSTEM AND METHOD INCLUDING ANTI-HYSTERESIS CONTROL

(75) Inventors: Paul S. Evans, Gilbert, AZ (US); James N. Quitmeyer, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 459 days.

(21) Appl. No.: 10/993,608

(22) Filed: Nov. 19, 2004

(65) Prior Publication Data

US 2006/0108864 A1    May 25, 2006

(51) Int. Cl.
*G06F 17/00* (2006.01)
*B60T 8/86* (2006.01)

(52) U.S. Cl. ............................................. 701/70; 701/3
(58) Field of Classification Search ............... None
See application file for complete search history.

(56) References Cited

U.S. PATENT DOCUMENTS

| | | | |
|---|---|---|---|
| 4,052,642 A | 10/1977 | Speth et al. | |
| 4,078,845 A | 3/1978 | Amberg et al. | |
| 4,143,415 A | 3/1979 | Klingbeil | |
| 5,575,542 A | 11/1996 | Tanaka et al. | |
| 5,598,077 A | 1/1997 | Matsubara et al. | |
| 5,691,616 A | 11/1997 | Iwashita | |
| 5,720,534 A * | 2/1998 | Stumpe | 303/166 |
| 5,804,940 A | 9/1998 | Erkens et al. | |
| 5,909,370 A | 6/1999 | Lynch | |
| 5,980,080 A | 11/1999 | Loparo et al. | |
| 5,986,424 A | 11/1999 | Nakatsuka et al. | |
| 6,003,640 A * | 12/1999 | Ralea | 188/71.5 |
| 6,176,352 B1 * | 1/2001 | Maron et al. | 188/1.11 E |
| 6,240,324 B1 | 5/2001 | Preska et al. | |
| 6,274,994 B2 | 8/2001 | Tsutsui | |
| 6,299,262 B1 | 10/2001 | Salamat et al. | |
| 6,347,255 B1 | 2/2002 | Moser et al. | |
| 6,424,873 B1 | 7/2002 | Przybylski | |
| 6,471,015 B1 * | 10/2002 | Ralea et al. | 188/1.11 L |
| 6,480,130 B1 | 11/2002 | Hanson et al. | |
| 6,688,532 B2 | 2/2004 | Nanno et al. | |
| 6,751,510 B1 | 6/2004 | Tan et al. | |
| 2004/0064204 A1 | 4/2004 | Frutiger | |

* cited by examiner

*Primary Examiner*—Michael J. Zanelli
(74) *Attorney, Agent, or Firm*—Ingrassia Fisher & Lorenz

(57) ABSTRACT

An aircraft brake actuation system implements an anti-hysteresis feature that compensates for various hysteresis effects exhibited in an aircraft brake actuation system due to one or more sources of mechanical inefficiency within the system. The anti-hysteresis feature adjusts the command signal up or down, depending on the direction of the command, a predetermined amount based on the amount of hysteresis in the system. By doing so, the actual brake force supplied to the aircraft brake elements more accurately represents the brake force being commanded.

32 Claims, 8 Drawing Sheets

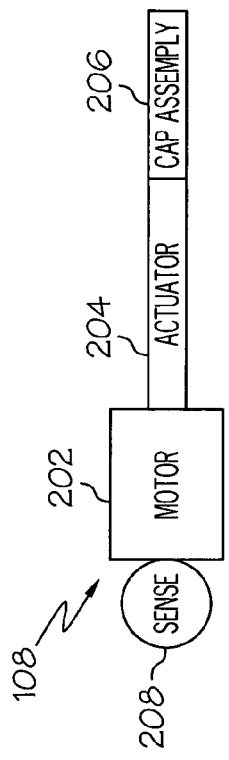

AIRCRAFT BRAKE ACTUATION SYSTEM AND METHOD INCLUDING ANTI-HYSTERESIS CONTROL

TECHNICAL FIELD

The present invention relates to aircraft brake actuation systems and, more particularly, to a controller for an aircraft brake actuation system that compensates for mechanical hysteresis in the system.

BACKGROUND

When a jet-powered aircraft lands, the aircraft brakes, various aerodynamic drag sources (e.g., flaps, spoilers, etc.), and, in many instances, aircraft thrust reversers, are used to slow the aircraft down in the desired amount of runway distance. Once the aircraft is sufficiently slowed, and is taxiing from the runway toward its ground destination, the aircraft brakes are used slow the aircraft, and bring it to a stop at its final ground destination.

Presently, many aircraft brake systems include a plurality of hydraulic, pneumatic, or electromechanical actuators, and a plurality of wheel mounted brakes. The brakes in many aircraft are implemented as multi-disk brakes, which include a plurality of stator disks and rotor disks. The stator disks and rotor disks may be alternately splined to a torque tube or wheel rim, and disposed parallel to one another, to form a brake disk packet. The actuators, in response to an appropriate pilot-initiated command, move between an engage position and a disengage position. In the engage position, the actuators each engage the brake disk packet, moving the brake disks into engagement with one another, to thereby generate the desired braking force.

An aircraft brake actuation system, like many other control systems, may exhibit hysteresis. This hysteresis may result from various position control errors and from friction and/or other inefficiencies in various mechanical elements in the system. For example, in an aircraft brake actuation system the actuators may exhibit gear losses, and some compliance may exist between the actuator power unit (e.g., the motor) and the actuator output. Moreover, frictional losses and compliance may exist between the actuator output and the brake disk packet, as well as within the brake disk packet itself. The position control errors can be corrected, or at least made negligible, with appropriate position control schemes. The hysteresis effects due to the various mechanical inefficiency sources are, however, more difficult to address, and can cause errors in control accuracy and a phase shift in system frequency response.

Hence, there is a need for a system and method that compensates for the hysteresis effects that may be exhibited in an aircraft brake actuation system due to one or more sources of mechanical inefficiency. The present invention addresses at least this need.

BRIEF SUMMARY

The present invention provides a system and method that compensates for the hysteresis effects exhibited in an aircraft brake actuation system due to one or more sources of mechanical inefficiency within the system. In one embodiment, and by way of example only, an aircraft brake actuation system that exhibits a predetermined amount of mechanical hysteresis due to one or more sources of mechanical inefficiency includes an actuator controller and an electromechanical brake actuator. The actuator controller is adapted to receive a brake command signal representative of a desired brake force and is operable, in response thereto, to adjust the brake command signal a predetermined amount based on the predetermined amount of mechanical hysteresis, and to supply a brake force actuator command signal based on the adjusted brake command signal. The electromechanical brake actuator is coupled to receive the brake force actuator command signal and is operable, in response thereto, to move to a position that will supply the desired brake force.

In another exemplary embodiment, an aircraft brake actuator controller includes a command filter circuit, an anti-hysteresis circuit, and a position control circuit. The command filter circuit is adapted to receive a brake command signal and is operable, upon receipt thereof, to supply an actuator position command signal, to determine a rate of change of the brake command signal, and to supply a brake command rate signal representative of the determined rate of change. The anti-hysteresis circuit is coupled to receive the brake command rate signal and is operable, in response thereto, to supply an actuator position command adjustment signal. The position control circuit is coupled to receive the actuator position command signal and the actuator position command adjustment signal and is operable, in response thereto, to adjust the actuator position command signal a predetermined amount, based on the actuator position command adjustment signal, and to supply a brake force actuator command signal based on the adjusted actuator position command signal.

In yet another exemplary embodiment, an aircraft brake actuation system that exhibits a predetermined amount of mechanical hysteresis due to one or more sources of mechanical inefficiency includes actuator control means and actuator means. The actuator control means is for receiving a brake command signal representative of a desired brake force, for adjusting the brake command signal a predetermined amount based on the predetermined amount of mechanical hysteresis, and for supplying a brake force actuator command signal based on the adjusted brake command signal. The actuator means is for moving, in response to the brake force actuator command signal, to a position that will supply the desired brake force.

In still a further exemplary embodiment, a method of controlling movement of an aircraft brake actuator in an aircraft brake actuation system that exhibits a predetermined amount of mechanical hysteresis due to one or more sources of mechanical inefficiency includes supplying a brake command representative of a desired brake force magnitude to be supplied by the aircraft brake actuator. The brake command is adjusted a predetermined amount based on the predetermined amount of mechanical hysteresis. The aircraft brake actuator is moved to a position that corresponds to the adjusted brake command, whereby the aircraft brake actuator supplies the desired brake force magnitude.

Other independent features and advantages of the preferred aircraft brake actuation control system and method will become apparent from the following detailed description, taken in conjunction with the accompanying drawings which illustrate, by way of example, the principles of the invention.

BRIEF DESCRIPTION OF THE DRAWINGS

FIG. 2 is a simplified diagram of an exemplary electromechanical brake actuator that may be used in the system of FIG. 1;

FIG. 3 is a functional block diagram of an actuator controller according to an embodiment of the present invention and that may be used in the system of FIG. 1;

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background of the invention or the following detailed description of the invention. In this regard, before proceeding with the detailed description, it is to be appreciated that the described embodiment is not limited to use in conjunction with a specific vehicle or brake system. Thus, although the description is explicitly directed toward an embodiment that is implemented in an aircraft brake actuation system, it should be appreciated that it can be implemented in other vehicles and other brake actuation system designs, including those known now or hereafter in the art.

Figure 1:
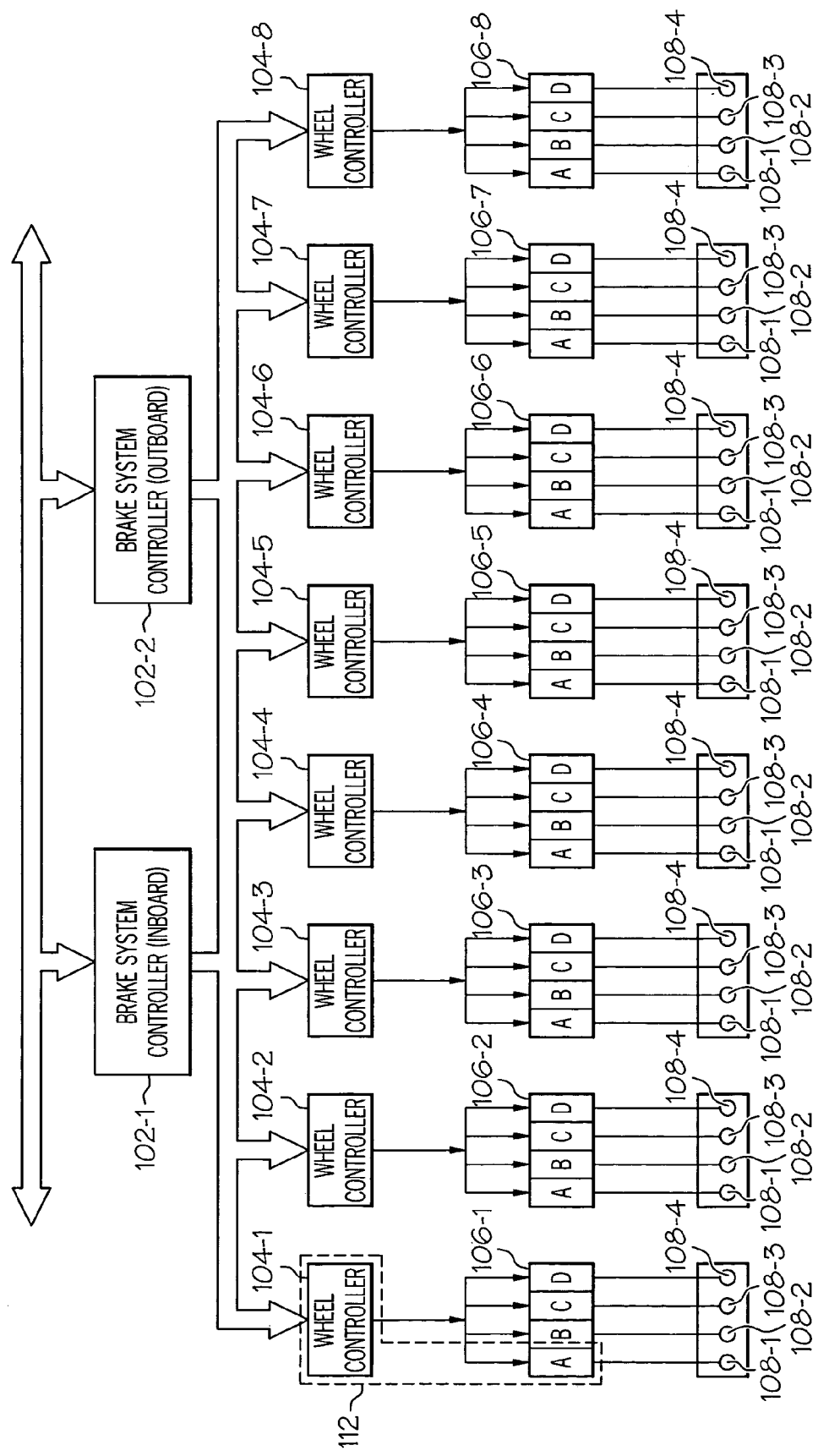
FIG. 1 is a functional block diagram of an exemplary aircraft brake actuation system.

Turning now to the description, and with reference first to FIG. 1, a functional block diagram of an exemplary aircraft brake actuation system 100 is shown. In the depicted embodiment, the system 100 includes a plurality of brake system controllers 102, a plurality of wheel controllers 104, a plurality of actuator controllers 106, and a plurality of brake actuator assemblies 108. To provide redundancy, the system 100 includes two brake system controllers 102, an inboard brake system controller 102-1, and an outboard brake system controller 102-2, though it will be appreciated that it could include more than this number. Each brake system controller 102 receives brake command signals from, for example, brake pedal transducers (not shown) located in an aircraft cockpit (also not shown), which are representative of a desired brake force. The brake system controllers 102 are each configured to process the brake command signals from the transducers, and supply processed brake command signals to each of the wheel controllers 104.

The wheel controllers 104 are each coupled to receive the processed brake command signals supplied from each brake system controller 102 and are operable, in response to the received commands, to supply brake force command signals that are also representative of the desired brake force. In the depicted embodiment, the system 100 includes eight wheel controllers 104-1 through 104-8, though it will be appreciated that it could include more or less than this number depending, for example, on the number of wheels on the vehicle that are to be braked. No matter the specific number of wheel controllers 104 that are used, each wheel controller 104 supplies brake force command signals to one or more of the actuator controllers 106. In the depicted embodiment, each wheel controller 104 supplies brake force command signals to four actuator controllers 106, though it will be appreciated that this is merely exemplary.

In the depicted embodiment, the system includes thirty-two actuator controllers 106-1a, b, c, d through 106-8a, b, c, d, one for each brake actuator assembly 108. It will be appreciated, however, that this is merely exemplary and that the system 100 could be implemented with more or less than this number of actuator controllers 106. In any case, each actuator controller 106, upon receipt of the brake force command signals, supplies brake force actuator command signals to one of the brake actuator assemblies 108.

In response to the brake force actuator command signals, each actuator assembly 108 moves to a position that will supply the commanded brake force to a wheel 110. In the depicted embodiment, the system 100 is configured to be used with an aircraft that includes up to eight wheels 110, with four brake actuator assemblies 108-1, 108-2, 108-3, 108-4 per wheel 110 supplying the commanded brake force thereto. Thus, the system 100 may include up to a total of thirty-two brake actuator assemblies 108. It will be appreciated that this is merely exemplary of a particular embodiment, and that the system 100 could be configured to include more or less than this number of brake actuator assemblies 108.

From the above description, and as shown in FIG. 1, it will be appreciated that each actuator controller 106, together with its associated wheel controller 104, forms a control circuit 112 that controls a single brake actuator assembly 108. Thus, in the depicted embodiment, the system 100 includes thirty-two control circuits 112 (only one of which is delineated with a reference numeral), with each wheel controller 104 forming part of four of the control circuits 112. As will be described in more detail further below, each control circuit 112, upon receipt of a brake command signal, is configured to adjust the brake command signal a predetermined amount based on a predetermined amount of mechanical hysteresis in the brake actuation system 100. Thus, the brake force actuator command signals supplied to each brake actuator assembly 108 are based on the adjusted brake command signal. Before describing the control circuit 112 in more detail, a brief description of an exemplary embodiment of a brake actuator assembly 108 will first be provided.

Turning now to FIG. 2, a simplified diagram of an exemplary physical embodiment of the brake actuator assembly 108 that may be used with the system 100 is shown and will now be briefly described. The depicted actuator assembly 108 is an electromechanical actuator and includes a motor 202, an actuator 204, a cap assembly 206, and a position sensor 208. The motor 202 receives the brake force actuator command signals from one of the actuator controllers 106 and, in response, rotates in the commanded direction to supply a rotational drive force. The motor 202 may be any one of numerous types of motors including, for example, hydraulic, pneumatic, and electric motors, the motor 202 is preferably an electric motor. Moreover, although the motor 202 may be implemented as any on of numerous types of electric motors, in a particular preferred embodiment, it is implemented as a brushless DC motor. No matter the particular type of motor 202 that is used, the rotational drive force supplied thereby is used to rotate the actuator 204.

The actuator 204 is coupled to receive the rotational drive force from the motor 202 and, in response thereto, to translate to a position that corresponds to the commanded brake force. The actuator 204 may be any one of numerous actuators that exhibit this functionality, but in a particular preferred embodiment the actuator 204 is a ballscrew-type actuator. As is generally known, a ballscrew actuator typically includes an inner, externally-threaded ballscrew, and an external, internally-threaded ballnut, neither of which is illustrated. A plurality of balls, which are also not illustrated, are disposed in the threads between the ballscrew and ballnut.

The ballscrew-type actuator 204 converts the rotational drive force received from the motor 202 to translational motion in one of two ways, depending upon its configuration. In a first configuration, the ballscrew is configured to rotate and receives the rotational drive force from the motor, and the ballnut is anti-rotated. Thus, upon receipt of the rotational drive force, the ballscrew will rotate and the ballnut will translate. In a second configuration, the ballscrew is configured to translate, and the ballnut, while being fixed axially, is configured to rotate and receives the rotational drive force from the motor. Thus, upon receipt of the rotational drive force, the ballnut will rotate and the ballscrew will translate. It will be appreciated that these two ballscrew-type actuator configurations are merely exemplary, and that various other configurations may be used.

No matter the particular type or configuration of the actuator 204, as FIG. 2 additionally shows, the cap assembly 206 is coupled to an end thereof, and thus translates therewith. The cap assembly 206 engages an aircraft brake element (not shown) in its associated wheel 110, and supplies the commanded brake force thereto.

The position sensor 208 is configured to sense the position of the actuator 204 and supply an actuator position signal representative thereof to its associated control circuit 112. It will be appreciated that the position sensor 208 may sense actuator position in any one of numerous ways, using any one of numerous types of sensors. For example, the position sensor 208 could sense actuator position directly using, for example, a magnetic sensor, an optic sensor, or a resistive type sensor. In the depicted embodiment, however, the position sensor 208 is implemented as a resolver that senses the rotational position of the motor 202, which corresponds to actuator position. The actuator position signal supplied by the position sensor 208 is fed back to the actuator controller 106, where it is used to control the position of, and thus the force supplied by, the brake actuator 108.

With reference to FIG. 3, a more detailed description of a preferred embodiment of one of the control circuits 112 will now be described. Before doing so, however, it will be appreciated that the control circuit 112 is, for clarity and ease of explanation, depicted using functional circuit blocks, and is described as being implemented using individual circuits. Nonetheless, it will be additionally be appreciated that one or more (or all) of the depicted and described circuits and/or circuit blocks could be implemented as individual, discrete circuit components, or as one or more integrated circuits. It will additionally be appreciated that the control circuit 112, and the hereinafter described control methodology, can be implemented using analog signals, digital signals, software, firmware, or combinations thereof. Moreover, the specific physical location of each of the functional blocks that make up the control circuit 112, be it as part of the wheel controller 104 or the actuator controller 106, is not shown in FIG. 3, as the skilled artisan will appreciate that each of the functional blocks could form part of either, or both, of the wheel or actuator controllers 104, 106, or even as part of one or more of the brake system controllers 102, if so desired.

Turning now to the description, it is seen in FIG. 3 that the control circuit 112 preferably includes a command filter circuit 302, an anti-hysteresis circuit 304, a position control circuit 306, and a feed-forward circuit 308. The command filter circuit 302 receives the brake command signal from a brake system controller 102 and, in response, supplies a filtered actuator position command signal. The command filter circuit 302 additionally determines a rate of change of the supplied brake command signal, and supplies a brake command rate signal representative of the determined rate of change. To implement this functionality, the command filter circuit 302 includes a converter 312, a comparator 314, a rate amplifier 316, a limiter 318, and an integrator 322. The converter 312 converts the brake command signal supplied from the brake system controller 102 to a position command signal. To do so, the converter 312 implements a predetermined schedule, which may be stored in a non-illustrated memory, of actuator position versus desired force.

The comparator 314 receives the position command signal supplied from the converter 312, and a filtered position command signal fed back from the output of the integrator 322. Because the filtered position command signal fed back from the output of the integrator 322 is delayed relative to the position command signal supplied from the converter 312, the comparator 314 supplies a rate signal representative of the rate of change of the position command signal being supplied from the converter 312. It will be appreciated that this is also representative of the rate of change of the brake command signal supplied from the brake system controller 102. The rate signal from the comparator 314 is input to the rate amplifier 316. In turn, the rate amplifier 316 supplies a predetermined amount of gain ($K_{rate}$) to the rate signal.

The rate signal is then supplied to the limiter 318, which limits the rate signal to a predetermined rate magnitude. The limit on the rate signal prevents saturation of the control circuit 112 when relatively large changes in brake force commands are issued by the brake system controller 102. After passing through the limiter 318, the rate signal is supplied to the integrator 322, as well as to the anti-hysteresis circuit 304 and the feed-forward circuit 308, both of which are described in more detail further below. The integrator 322 integrates the rate signal to thereby supply the filtered actuator position command signal. As noted above, a filtered actuator position command signal output from the integrator 322 is fed back to the comparator 314, and is also supplied to the position control circuit 306.

The anti-hysteresis circuit 304, as was noted above, receives the rate signal generated in the command filter circuit 302. In response to the rate signal, the anti-hysteresis circuit 304 supplies an actuator position command adjustment signal. More specifically, the anti-hysteresis circuit 304 includes a position command adjustment circuit 324 that determines, based on the rate signal from the command filter circuit 302, the direction in which the brake actuator 108 is being commanded to move, and supplies the actuator position command adjustment signal accordingly. For example, if the rate signal indicates that the brake actuator 108 is being commanded to move in the engage position, the position command adjustment circuit 324 supplies an anti-hysteresis signal representative of a predetermined anti-hysteresis value that will result in the actuator position command signal supplied from the rate determination circuit 302 to be adjusted upwardly a predetermined amount. Conversely, if the rate signal indicates that the brake actuator 108 is being commanded to move in the disengage position, the position command adjustment circuit 324 supplies an anti-hysteresis signal representative of a predetermined anti-hysteresis value that will result in the actuator position command signal supplied from the rate determination circuit 302 to be adjusted downwardly a predetermined amount.

Although the anti-hysteresis circuit 304 could be implemented with just the position command adjustment circuit 324, in the depicted embodiment the anti-hysteresis circuit 304 includes two additional circuits—a position-limit circuit 326, and a multiplier circuit 328. As FIG. 3 shows, the position-limit circuit 326 includes a clearance comparator circuit 332 and a limiter 334. The clearance comparator circuit 332 compares the position command signal supplied from the converter 312 in the rate determination circuit 302 to a predetermined clearance value 336, and supplies a command-clearance difference signal representative of the difference between the two signals. The predetermined clearance value 336 is representative of the maximum amount of clearance that may exist between the brake actuator 108 and the aircraft brake element when the brake actuator 108 is in its fully disengaged position. This amount of clearance is sometimes referred to as "actuator setback." The limiter 334 receives the command-clearance difference signal from the clearance comparator circuit 332, and limits this signal such that it is representative of non-negative values only. The command-clearance difference signal, limited to a non-negative value if necessary, is supplied to the multiplier circuit 328.

The multiplier circuit 328 receives the anti-hysteresis signal from the position command adjustment circuit 324 and the command-clearance difference signal from the limiter 334, and multiplies these two signals together to generate the actuator position adjustment signal. Thus, the predetermined anti-hysteresis value from the position command adjustment circuit 324 sets the proportion of the position, commanded past the brake engagement point, which is either added to or subtracted from the filtered actuator position command signal in the position control circuit 306, which will now be described in more detail.

Before describing the position control circuit 306, it will be appreciated that the predetermined amount that the actuator position command adjustment signal adjusts the filtered actuator position command signal may vary depending, for example, on the direction the brake actuator 108 is being commanded to move, as well as on system requirements, system design, and the amount of position hysteresis exhibited in the system that is caused by various mechanical inefficiency sources. In a particular preferred embodiment, the actuator position command adjustment signal supplied from the anti-hysteresis circuit adjusts the actuator position command signal, either upwardly or downwardly, an amount that is approximately equal to the half-width of the position hysteresis. It has been found that this amount of adjustment minimizes the position error that results from various sources of mechanical hysteresis including, for example, gear and other mechanical component inefficiencies, friction, and actuator and brake disk compliance.

Turning now to the position control circuit 306, it is seen that this circuit 306 is coupled to receive the filtered actuator position command signal and, as was just noted, the actuator position command adjustment signal. The position control circuit 306 additionally receives the actuator position signal that is fed back from the actuator position sensor 208. In response to each of these signals, the position control circuit 306 supplies an appropriate brake force actuator command signal. More specifically, the position control circuit 306, among other things, adjusts the filtered actuator position command signal a predetermined amount based on the actuator position command adjustment signal, and supplies a brake force actuator command signal that is based on the adjusted actuator position command signal. The brake force actuator command signal, as was previously noted, is supplied to one of the brake actuators 108. Because the brake force actuator command is based on the adjusted actuator position command signal, which is adjusted based on the actuator position command adjustment signal, the brake actuator 108 receiving the brake force actuator command signal will move to a position that will accurately supply the commanded brake force.

To implement the above-described functionality, the position control circuit 306 includes an actuator position comparator circuit 338, and a compensator circuit 342. The actuator position comparator circuit 338 receives the filtered actuator position command, the actuator position adjustment command, and the actuator position signal. The actuator position comparator circuit 338 is configured, upon receipt of these signals, to add the actuator position adjustment signal to the filtered actuator position command signal, and subtract the actuator position signal, to thereby generate an actuator position error signal. The actuator position error signal is then supplied to the compensator circuit 342.

In the depicted embodiment, the compensator circuit 342 is implemented as a proportional-plus-integral (PI) compensator, that includes an actuator position error comparator circuit 344 and, as is generally known, a proportional circuit 346 and an integrator circuit 348. The actuator position error comparator circuit 344 receives the actuator position error signal from the actuator position comparator circuit 338 and a feed-forward rate signal from the feed-forward circuit 308. In response, the actuator position error comparator circuit 344 supplies a further adjusted actuator position error signal. The further adjusted actuation position error signal is supplied to the PI compensator proportional circuit 346, which prevents windup of the PI compensator integrator circuit 348, and thus minimizes position overshoot. As shown in FIG. 3, the feed-forward circuit 308 includes an amplifier circuit 352 that applies a predetermined amount of gain ($K_{ff}$) to the rate signal supplied from the rate limiter 318.

The PI compensator 342 receives the actuator position error signal and, in response, supplies the brake force actuator command signal. In the preferred embodiment, the brake actuator assembly 108 is driven by a DC motor 202. Thus, in the depicted embodiment, the brake force actuator command signal is a DC signal having a voltage magnitude that is proportional to the commanded brake force. Thus, to limit the voltage magnitude supplied to the motor 202 to within an acceptable range, a voltage-limiter circuit 354 is also included in the position control circuit 306. Once the brake force actuator command signal is processed, and limited, if necessary, in the voltage-limiter circuit 356, it is supplied to the brake actuator assembly motor 202, which moves the actuator 204 to a position that will supply the commanded brake force.

Figure 4:
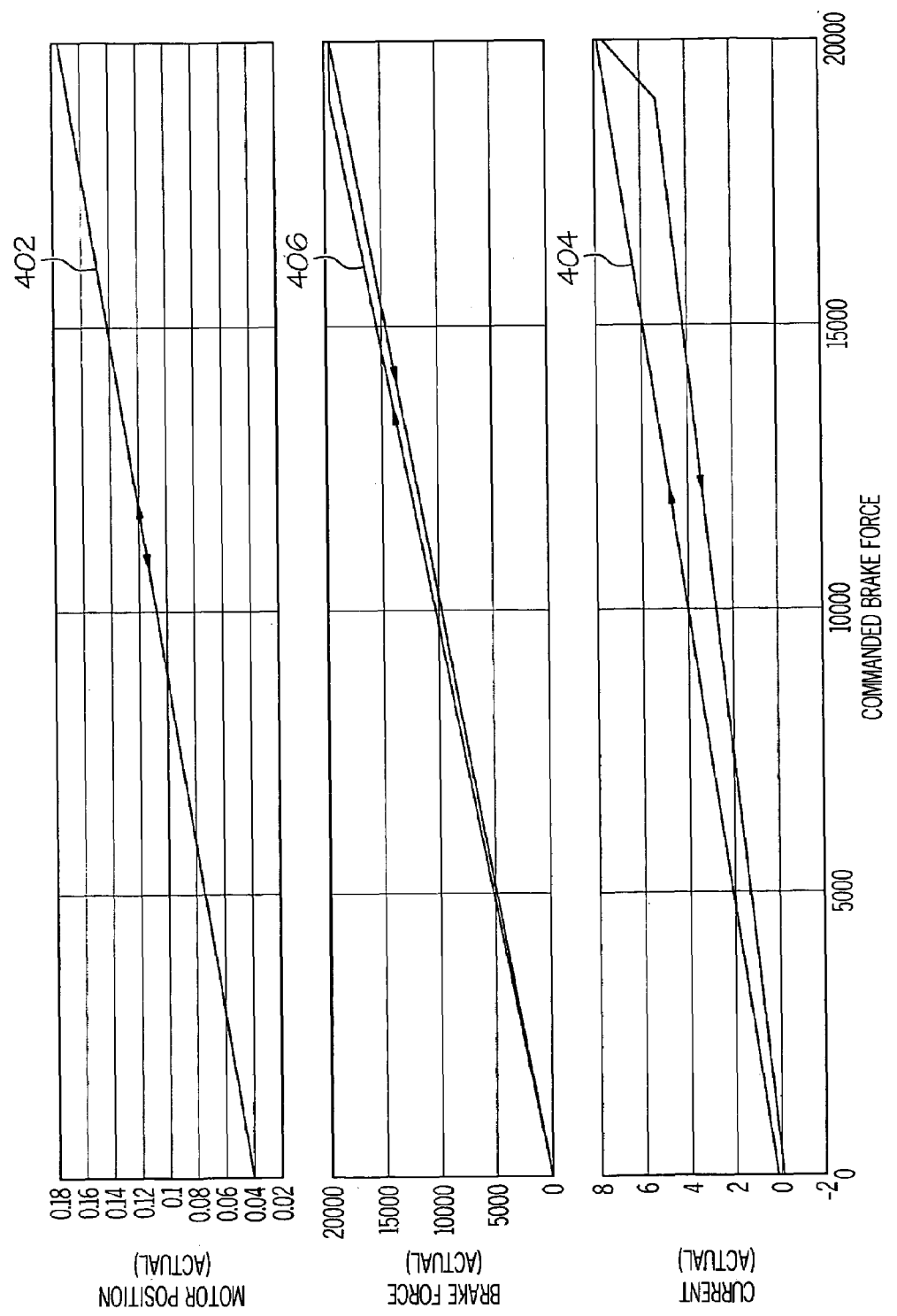
FIGS. 4 and 5 are graphs depicting the steady state response of the system depicted in FIG. 1 that does include, and does not include, respectively, the anti-hysteresis control of the present invention.
Figure 5:
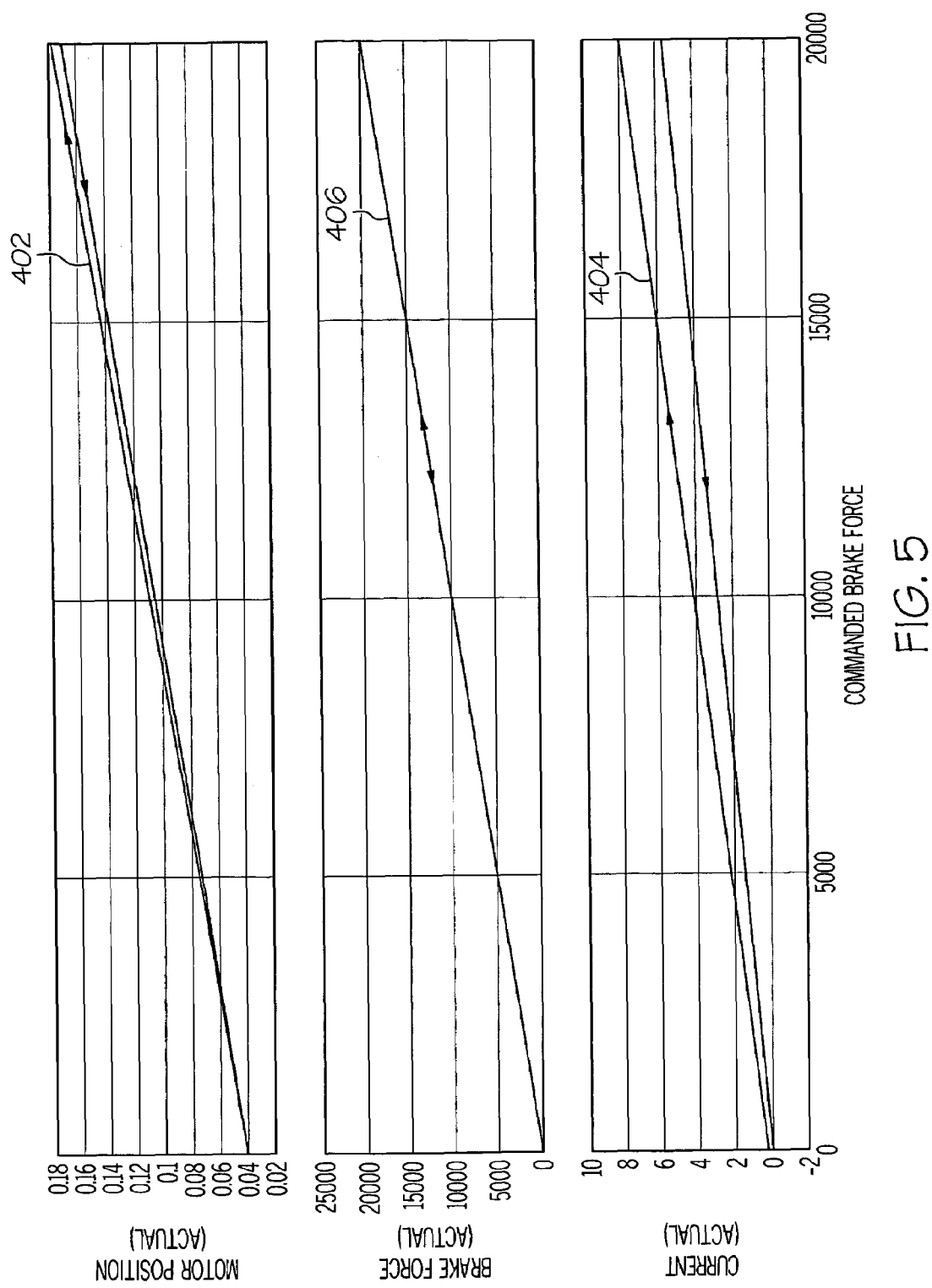
Figure 6:
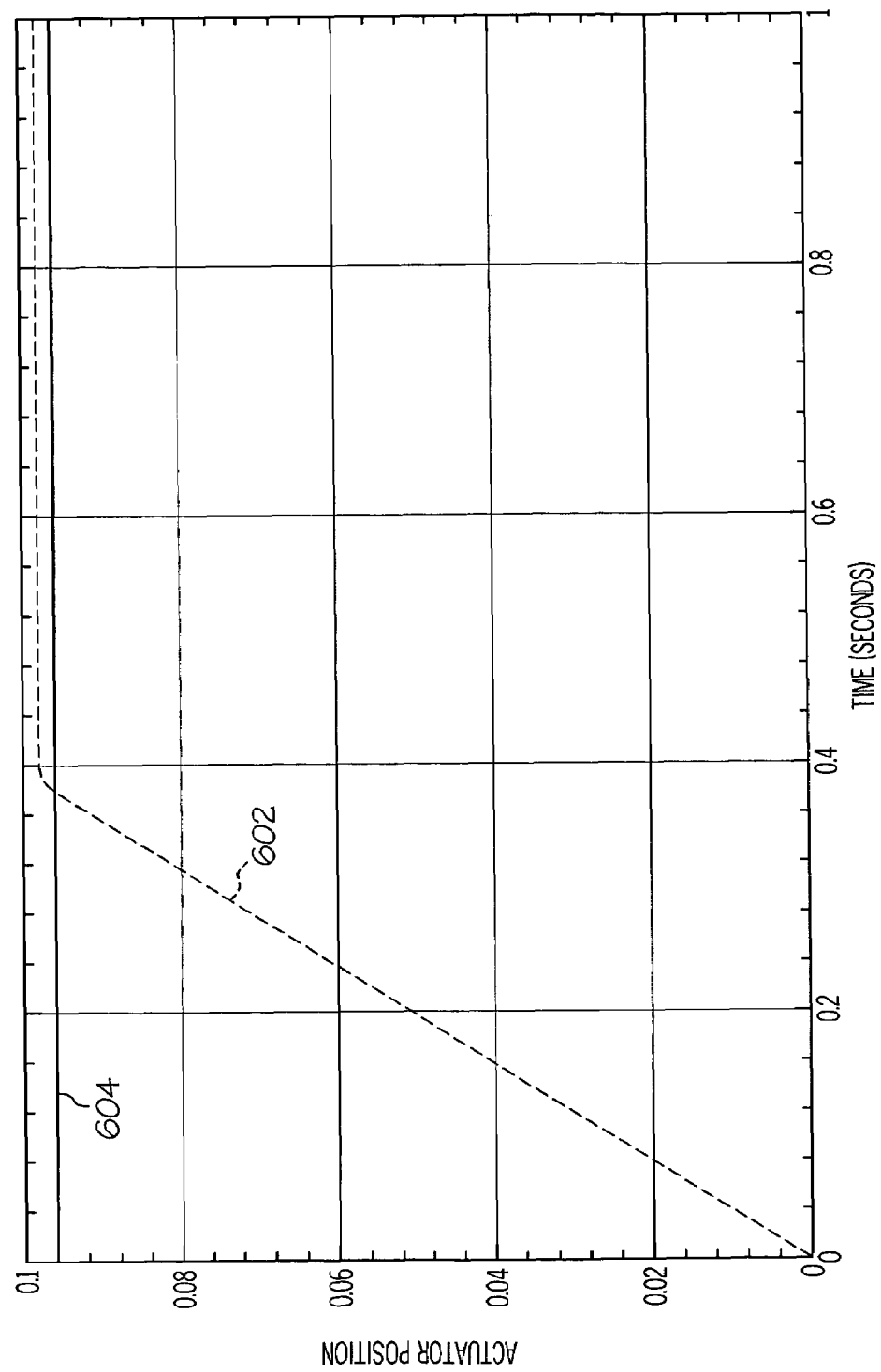
FIGS. 6-9 are graphs depicting the step response of the system depicted in FIG. 1 that does include, and does not include, respectively, the anti-hysteresis control of the present invention.
Figure 7:
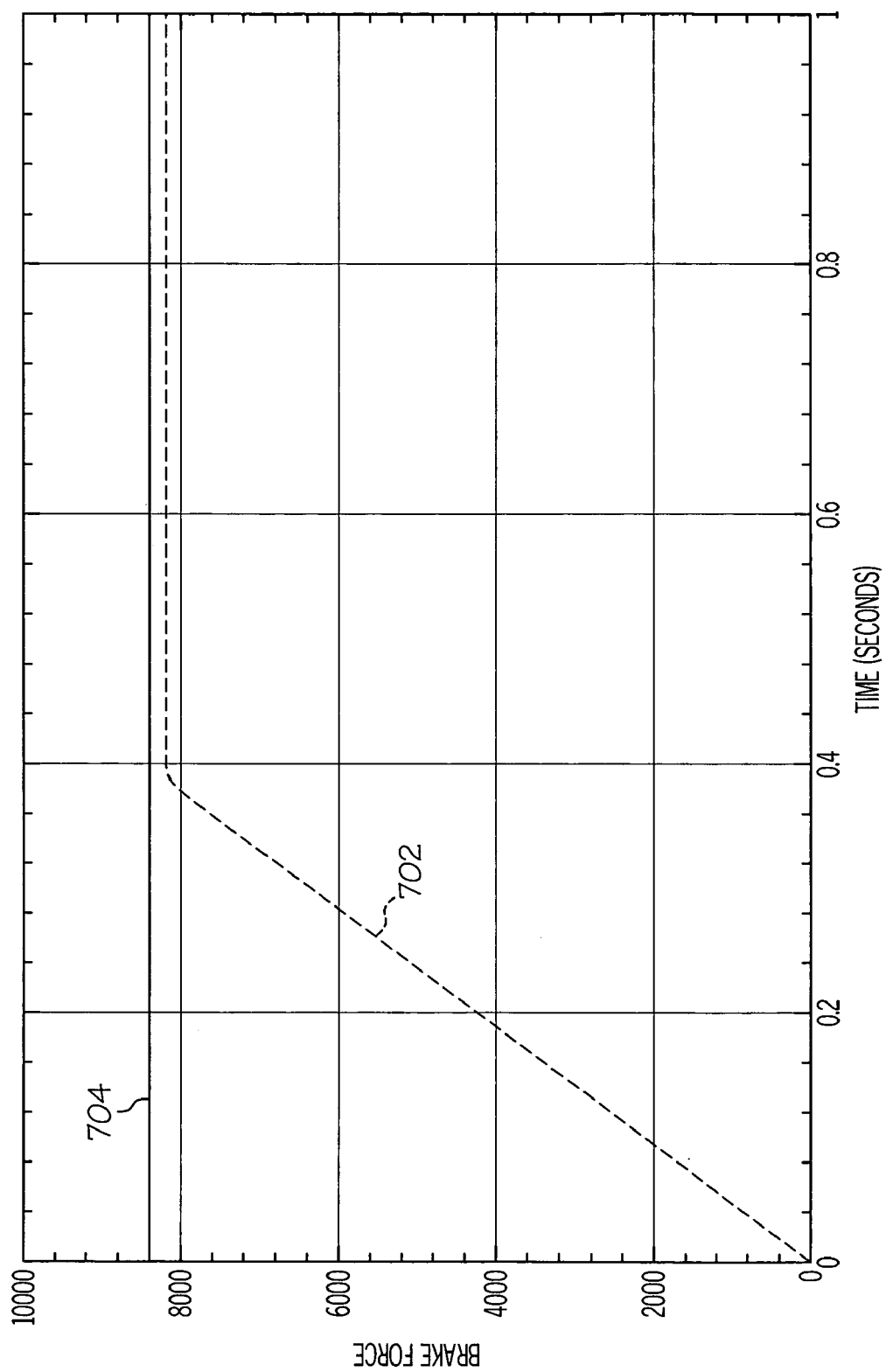
Figure 8:
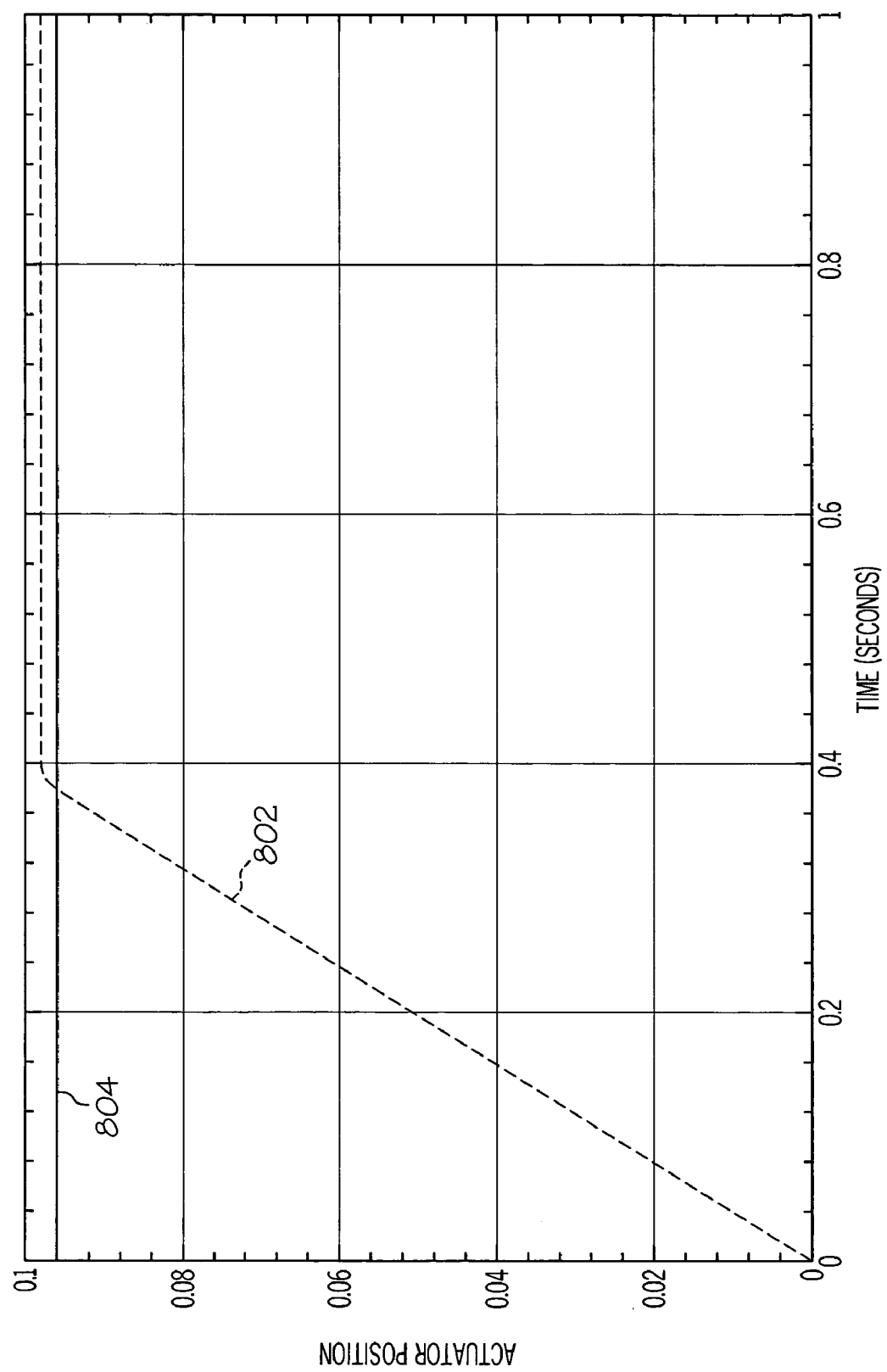
Figure 9:
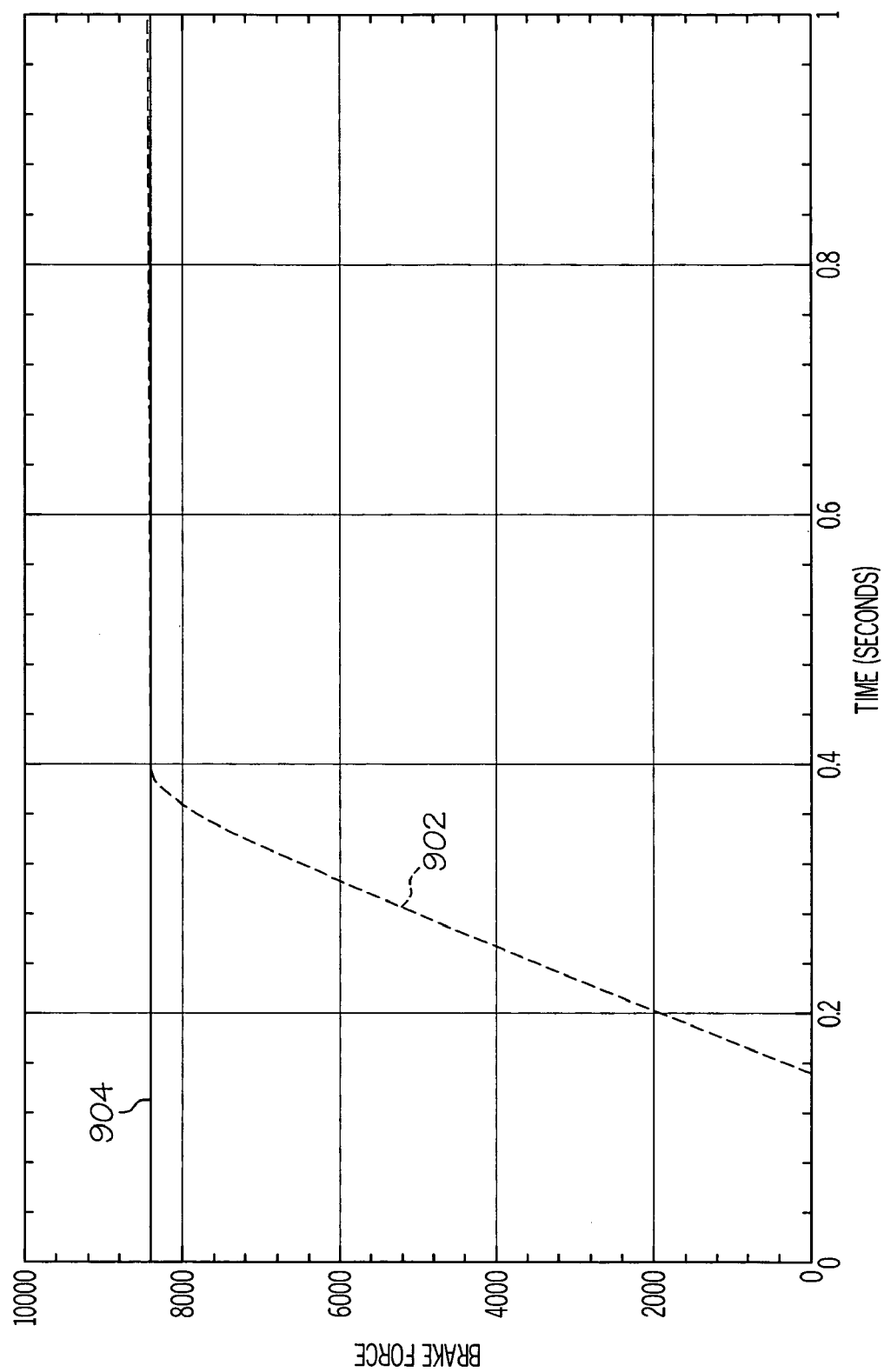

Turning now to FIGS. 4-10, a comparison will be made of system responses for an exemplary brake actuation control system 100 that does not include the above-described anti-hysteresis control and a system 100 that does include the above-described anti-hysteresis control. Referring first to FIGS. 4 and 5, the steady state response of the brake actuation control system 100 with and without anti-hysteresis control, respectively, is shown. As FIG. 4 shows, in the system 100 without anti-hysteresis control, actual motor position 402 (e.g., actuator position) faithfully follows its commanded position. However, in order to compensate for various sources of mechanical inefficiency, the motor current 404 is increased above the nominal value while actual brake force 406 is increasing, or is decreased below the nominal value while actual brake force 406 is decreasing. These same mechanical inefficiencies also result in the depicted hysteresis in actual brake force 406, and the inaccuracies between actual brake force 406 and commanded brake force. Conversely, as shown in FIG. 5, with the anti-hysteresis control implemented, although the motor position 402 now exhibits an amount of hysteresis, and the motor current 404 continues to exhibit hysteresis, the actual brake force 406 faithfully follows the commanded brake force The difference in system response is further illustrated in FIGS. 6-9, which illustrate step responses of an exemplary brake actuation control system 100 with and without anti-hysteresis control. Specifically, FIGS. 6 and 7 depict the response of actuator position and brake force, respectively, to a step increase in commanded brake force, with a 0.04" actuator setback, without anti-hysteresis control, and FIGS. 8 and 9 depict these same respective responses for the same system, but with anti-hysteresis control.

As shown in FIG. 6, the position response without anti-hysteresis control is quite good, in that the actual actuator position 602 moves to the commanded position 604. However, as FIG. 7 shows, the force response is less accurate, in that the actual applied force 702, due to the various sources of mechanical inefficiencies, is less than the commanded force 704. However, as shown in FIGS. 8 and 9, with anti-hysteresis control the actual actuator position 802 is slightly greater than the commanded position 804, whereas the actual applied force 902 is now equal, or substantially equal, to the commanded brake force 904.

The system and method described herein provides an aircraft brake actuation system that compensates for various hysteresis effects exhibited in an aircraft brake actuation system due to one or more sources of mechanical inefficiency within the system. Thus, the actual brake force supplied to the aircraft brake elements more accurately represents the brake force being commanded.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An aircraft brake actuation system that exhibits a predetermined amount of hysteresis due to one or more sources of mechanical inefficiency, the system comprising:
a control circuit adapted to receive a brake command signal representative of a desired brake force and operable, in response thereto, to (i) adjust the brake command signal a predetermined amount based on the predetermined amount of hysteresis and (ii) supply a brake force actuator command signal based on the adjusted brake command signal; and
an electromechanical brake actuator coupled to receive the brake force actuator command signal and operable, in response thereto, to move to a position that will supply the desired brake forces,
wherein the adjusted brake command signal is an adjusted actuator position command signal, and wherein the control circuit comprises:
a command filter circuit configured to receive the brake command signal and operable, in response thereto, to (i) supply an actuator position command signal, (ii) determine a rate of change of the brake command signal, and (iii) supply a brake command rate signal representative of the determined rate of change;
an anti-hysteresis circuit coupled to receive the brake command rate signal and operable, in response thereto, to supply an actuator position command adjustment signal; and
a position control circuit coupled to receive the actuator position command signal and the actuator position command adjustment signal and operable, in response thereto, to (i) adjust the actuator position command signal a predetermined amount, based on the actuator position command adjustment signal, and (ii) supply the brake force actuator command signal based on the adjusted actuator position command signal.

2. The system of claim 1, further comprising:
a feed-forward circuit coupled between the command filter circuit and the position control circuit, the feed-forward circuit configured to receive the brake command rate signal and operable, in response thereto, to supply a feed-forward rate signal representative of the brake command rate signal to the position control circuit.

3. The system of claim 2, wherein:
the position control circuit is farther operable to combine the feed-forward rate signal with the adjusted actuator position command signal, to thereby supply a farther adjusted actuator position command signal; and
the brake command signal is based, at least in part, on the farther adjusted actuator position command signal.

4. The system of claim 1, wherein the command filter circuit includes a rate-limit circuit configured to limit the brake command rate signal to a predetermined rate magnitude.

5. The system of claim 1, wherein the position control circuit is implemented as a proportional-plus-integral (PI) control circuit.

6. The system of claim 1, wherein the electromechanical actuator comprises:
a motor coupled to receive the brake force actuator command signals from the position control circuit and operable, in response thereto, to supply a rotational drive force; and
an actuator coupled to receive the rotational drive force from the motor and configured, upon receipt thereof to move to the position that will supply the commanded brake force.

7. The system of claim 6, wherein:
the brake force actuator command signal supplied to the motor has a voltage magnitude; and
the position control circuit comprises a voltage-limiter configured to limit the brake command signal voltage magnitude to a predetermined voltage value.

8. The system of claim 1, wherein:
the command filter circuit includes a converter circuit, the converter circuit coupled to receive the brake command signal and operable, in response thereto, to convert the commanded brake force to the actuator position command signal; and
the brake command rate signal is an actuator position command rate signal representative of a rate of change of the actuator position command signal.

9. The system of claim 8, wherein the anti-hysteresis circuit includes:
a position command adjustment circuit coupled to receive the actuator position command rate signal and operable, in response thereto, to supply an anti-hysteresis signal representative of a predetermined anti-hysteresis value;

a position-limit circuit coupled to receive the actuator position command signal from the converter circuit and configured to limit the actuator position command signal to a positive value; and a multiplier circuit coupled to receive the anti-hysteresis signal and the positive value actuator position command signal and operable, in response thereto, to supply the actuator position command adjustment signal.

10. The system of claim 1, further comprising:
a position sensor configured to sense brake actuator position and supply an actuator position feedback signal representative thereof to the actuator controller.

11. The system of claim 1, wherein the electromechanical actuator comprises:
a motor coupled to receive the brake force actuator command signals from the position control circuit and operable, in response thereto, to supply a rotational drive force; and
an actuator coupled to receive the rotational drive force from the motor and configured, upon receipt thereof, to move to the position that will supply the commanded brake force.

12. The system of claim 11, further comprising:
a position sensor configured to sense brake actuator position and supply an actuator position feedback signal representative thereof to the actuator controller.

13. The system of claim 12, wherein:
the position sensor comprises a resolver coupled to the motor and configured to sense motor revolutions; and
the sensed brake actuator position and actuator position feedback signal are based on the sensed motor revolutions.

14. An aircraft brake actuator controller, comprising:
a command filter circuit adapted to receive a brake command signal and operable, upon receipt thereof, to (i) supply an actuator position command signal, (ii) determine a rate of change of the brake command signal, and (iii) supply a brake command rate signal representative of the determined rate of change;
an anti-hysteresis circuit coupled to receive the brake command rate signal and operable, in response thereto, to supply an actuator position command adjustment signal; and
a position control circuit coupled to receive the actuator position command signal and the actuator position command adjustment signal and operable, in response thereto, to (i) adjust the actuator position command signal a predetermined amount, based on the actuator position command adjustment signal, and (ii) supply a brake force actuator command signal based on the adjusted actuator position command signal.

15. The controller of claim 14, further comprising:
a feed-forward circuit coupled between the command filter circuit and the position control circuit, the feed-forward circuit configured to receive the brake command rate signal and operable, in response thereto, to supply a feed-forward position command signal representative of the actuator position command signal to the position control circuit.

16. The controller of claim 15, wherein:
the position control circuit is further operable to combine the feed-forward position command signal with the adjusted actuator position command signal, to thereby supply a further adjusted actuator position command signal; and
the brake command signal is based on the further adjusted actuator position command signal.

17. The controller of claim 14, wherein the command filter circuit includes a rate-limit circuit configured to limit the brake command rate signal to a predetermined rate magnitude.

18. The controller of claim 14, wherein the position control circuit is implemented as a proportional-plus-integral (PI) control circuit.

19. The controller of claim 14, wherein:
the brake force actuator command signal has a voltage magnitude; and
the position control circuit comprises a voltage-limiter configured to limit the brake command signal voltage magnitude to a predetermined voltage value.

20. The controller of claim 14, wherein the command filter circuit includes a converter circuit, the converter circuit adapted to receive the brake command signal and operable, in response thereto, to convert the commanded brake force to the actuator position command signal.

21. The controller of claim 20, wherein the anti-hysteresis circuit includes a position-limit circuit, the position-limit circuit coupled to receive the actuator position command signal from the converter circuit and configured to limit the actuator position command adjustment signal to a predetermined adjustment value.

22. An aircraft brake actuation system that exhibits a predetermined amount of hysteresis due to one or more sources of mechanical inefficiency, the system comprising:
actuator control means for (i) receiving a brake command signal representative of a desired brake force, (ii) adjusting the brake command signal a predetermined amount based on the predetermined amount of hysteresis, and (iii) supplying a brake force actuator command signal based on the adjusted brake command signal; and
actuator means for moving, in response to the brake force actuator command signal, to a position that will supply the desired brake force,
wherein the adjusted brake command signal is an adjusted actuator position command signal, and wherein the actuator control means comprises:
command filter means, responsive to the brake command signal, for (i) supplying an actuator position command signal, (ii) determining a rate of change of the brake command signal, and (iii) supplying a brake command rate signal representative of the determined rate of change;
anti-hysteresis means, responsive to the brake command rate signal, for supplying an actuator position command adjustment signal; and
position control means, responsive to the actuator position command signal and the actuator position command adjustment signal, for (i) adjusting the actuator position command signal a predetermined amount, based on the actuator position command adjustment signal, and (ii) supplying the brake force actuator command signal based on the adjusted actuator position command signal.

23. The system of claim 22, further comprising:
feed-forward means for supplying a feed-forward position command signal representative of the actuator position command signal to the position control circuit.

24. The system of claim 23, wherein:
the position control means combines the feed-forward position command signal with the adjusted actuator position command signal, to thereby supply a further adjusted actuator position command signal; and
the brake command signal is based on the farther adjusted actuator position command signal.

25. The system of claim 22, wherein the command filter means comprises rate limiting means for limiting the brake command rate signal to a predetermined rate magnitude.

26. The system of claim 22, wherein:
the brake force actuator command signal has a voltage magnitude; and
the position control means comprises voltage limiting means for limiting the brake command signal voltage magnitude to a predetermined voltage value.

27. The system of claim 22, further comprising:
converter means for converting the commanded brake force to the actuator position command signal.

28. The system of claim 27, further comprising:
position limiting means for limiting the actuator position command adjustment signal to a predetermined adjustment value.

29. The system of claim 22, further comprising:
sensor means for supplying a position feedback signal representative of a position of the actuator means to the controller means.

30. A method of controlling movement of an aircraft brake actuator in an aircraft brake actuation system that exhibits a predetermined amount of hysteresis due to one or more sources of mechanical inefficiency, the method comprising the steps of:

supplying a brake command representative of a desired brake force magnitude to be supplied by the aircraft brake actuator;
adjusting the brake command a predetermined amount based on the predetermined amount of hysteresis;
moving the aircraft brake actuator to a position that corresponds to the adjusted brake command, whereby the aircraft brake actuator supplies the desired brake force magnitude;
determining a rate of change of the brake command; and
adjusting the brake command the predetermined amount based on the determined brake command rate of change.

31. The method of claim 30, wherein:
the determined rate of change is either positive or negative, depending on whether the desired brake force magnitude is increasing or decreasing;
the brake command is increased the predetermined magnitude if the determined rate of change is positive; and
the brake command is decreased the predetermined amount if the determined rate of change is negative.

32. The method of claim 30, further comprising:
converting the brake command to an actuator position command;
adjusting the actuator position command based on the predetermined amount of hysteresis;
converting the adjusted actuator position command to the adjusted bite command.

* * * * *